United States Patent
McCloskey et al.

(10) Patent No.: US 6,600,004 B1
(45) Date of Patent: Jul. 29, 2003

(54) METHOD OF PREPARING POLYESTERCARBONATES

(75) Inventors: Patrick Joseph McCloskey, Watervliet, NY (US); Paul Michael Smigelski, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/118,634

(22) Filed: Apr. 10, 2002

(51) Int. Cl.[7] .............................................. C08G 64/00
(52) U.S. Cl. ...................... 528/198; 528/196; 528/271; 528/272; 568/716; 568/717; 568/722; 568/723; 568/724; 568/749; 568/750
(58) Field of Search ................................ 528/196, 198, 528/271, 272; 568/716, 717, 722, 723, 724, 749, 750

(56) References Cited

U.S. PATENT DOCUMENTS

| | | |
|---|---|---|
| 4,323,668 A | 4/1982 | Brunelle |
| 5,696,222 A | 12/1997 | Kaneko et al. |
| 5,880,248 A * | 3/1999 | Sakashita et al. |
| 6,232,429 B1 | 5/2001 | Banach et al. |
| 6,300,459 B1 | 10/2001 | Kaneko et al. |
| 6,414,106 B1 * | 7/2002 | Smigelski, Jr. et al. ..... 528/196 |

FOREIGN PATENT DOCUMENTS

EP 1114841 7/2001

* cited by examiner

*Primary Examiner*—Terressa M. Boykin
(74) *Attorney, Agent, or Firm*—Andrew J. Caruso; Noreen C. Johnson

(57) ABSTRACT

A method of preparing polyestercarbonates is presented in which a mixture of at least one activated diaryl carbonate is reacted under melt polymerization conditions with at least one aromatic dihydroxy compound together with at least one dicarboxylic acid. Polyestercarbonates possessing up to about percent 10 mole dicarboxylic acid residues based on the total amount of structural units derived from aromatic dihydroxy compounds are obtained. The method provides both for high levels of incorporation of the dicarboxylic acid into the polyestercarbonate backbone and a high level of polymer endcapping.

28 Claims, No Drawings

US 6,600,004 B1

METHOD OF PREPARING POLYESTERCARBONATES

BACKGROUND OF THE INVENTION

This invention relates to a method of preparing polyestercarbonates. More particularly the method relates to a method of preparing polyestercarbonates in which diacids rather than diesters are employed as starting materials and said diacids are incorporated into the polyestercarbonate backbone with a high level of efficiency.

Polyestercarbonates based on aliphatic diacids and aromatic bisphenols are known, commercially useful materials which are currently prepared under interfacial polymerization conditions comprising reaction of a mixture of a bisphenol such as bisphenol A (BPA) together with a dicarboxylic acid such as dodecandioic acid with phosgene in the presence of a solvent and an aqueous solution of an acid acceptor such as sodium hydroxide. "SP" polycarbonate which typifies such polyestercarbonates is a copolymer of BPA (~92 mole %) and dodecanedioic acid (DDDA) (~8 mole %) and is available from GE Plastics, Mt Vernon, Ind. Because the "SP" polycarbonate is prepared in the presence of a solvent, methylene chloride, the manufacture of "SP" polycarbonate currently requires a solvent removal. Solvent removal is typically carried out by introducing steam into a solution of the product polyestercarbonate, a process which can result in fusion of the isolated powder resin owing to the presence of solvent and the inherently lower glass transition temperatures of polyestercarbonates incorporating comonomer such as DDDA relative to the corresponding homopolycarbonates. Therefore only high molecular weight material can be manufactured this way.

An alternative route to polyestercarbonates using a melt process would be highly desirable to circumvent problems attending solvent removal and allow the manufacture of lower molecular weight polyestercarbonates having lower melt viscosities. However, utilizing the traditional melt polycarbonate approach utilizing diphenyl carbonate (DPC) as the carbonate source requires long reaction times and high temperatures to achieve high molecular weight. As an added drawback, less than 100% of the expensive DDDA is incorporated by this method. An alternate approach which circumvents this reduced reactivity of DDDA uses the diphenyl ester of DDDA in the melt polymerization. This approach, however, requires preparation of the diphenyl ester of the diacid and further escalates both the cost and complexity of the process. Thus, there exists a need for a new method which allows the efficient incorporation of diacid comonomers directly into polyestercarbonates without recourse to interfacial polymerization techniques and which demonstrate a higher level of efficiency than is observed using known melt polymerization techniques.

BRIEF SUMMARY OF THE INVENTION

The present invention provides a method for the preparation of polyestercarbonates, said method comprising preparing a mixture comprising at least one activated diaryl carbonate, at least one dihydroxy aromatic compound, at least one diacid, at least one melt polymerization catalyst and optionally one or more co-catalysts, and heating under melt polymerization conditions to afford a product polyestercarbonate.

The method further relates to the preparation of polycarbonate esters having a high level of polymer endcapping.

DETAILED DESCRIPTION OF THE INVENTION

The present invention may be understood more readily by reference to the following detailed description of preferred embodiments of the invention and the examples included therein. In the following specification and the claims which follow, reference will be made to a number of terms which shall be defined to have the following meanings:

The singular forms "a", "an" and "the" include plural referents unless the context clearly dictates otherwise.

"Optional" or "optionally" means that the subsequently described event or circumstance may or may not occur, and that the description includes instances where the event occurs and instances where it does not.

As used herein, the term "melt polycarbonate" refers to a polycarbonate made by the transesterification of a diaryl carbonate with a dihydroxy aromatic compound.

"BPA" is herein defined as bisphenol A or 2,2-bis(4-hydroxyphenyl)propane.

"Catalyst system" as used herein refers to the catalyst or catalysts that catalyze the transesterification of the bisphenol with the diaryl carbonate in the melt process.

"Catalytically effective amount" refers to the amount of the catalyst at which catalytic performance is exhibited.

As used herein the term "aliphatic radical" refers to a radical having a valence of at least one comprising a linear or branched array of atoms which is not cyclic. The array may include heteroatoms such as nitrogen, sulfur and oxygen or may be composed exclusively of carbon and hydrogen. Examples of aliphatic radicals include methyl, methylene, ethyl, ethylene, hexyl, hexamethylene and the like.

As used herein the term "aromatic radical" refers to a radical having a valence of at least one comprising at least one aromatic group. Examples of aromatic radicals include phenyl, pyridyl, furanyl, thienyl, naphthyl, phenylene, and biphenyl. The term includes groups containing both aromatic and aliphatic components, for example a benzyl group.

As used herein the term "cycloaliphatic radical" refers to a radical having a valance of at least one comprising an array of atoms which is cyclic but which is not aromatic. The array may include heteroatoms such as nitrogen, sulfur and oxygen or may be composed exclusively of carbon and hydrogen. Examples of cycloaliphatic radicals include cyclcopropyl, cyclopentyl cyclohexyl, tetrahydrofuranyl and the like.

As used herein the abbreviation "BMSC" stands for the activated diaryl carbonate bis(methyl salicyl) carbonate (CAS No. 82091-12-1).

The present invention provides a method for preparing polyestercarbonates by reacting under melt polymerization conditions at least one activated diaryl carbonate with at least one dihydroxy aromatic compound and at least one diacid in the presence of a catalytically effective amount of at least one melt polymerization catalyst and optionally one or more co-catalyst.

The activated diaryl carbonate used according to the method of the present invention is "activated" in the sense that it undergoes transesterification reaction under melt polymerization conditions with a dihydroxy aromatic compound at a rate faster than the rate of the corresponding reaction of diphenyl carbonate. Activated diaryl carbonates thus encompass diaryl carbonates substituted with one or more electronegative substitutents such as halogen, cyano, perhaloalky, nitro, acyl and the like. Examples of activated diaryl carbonates for use according to the method of the present invention include bis(2-acetylphenyl) carbonate, bis (4-acetylphenyl) carbonate, bis(2-pivaloylphenyl)

carbonate, bis(4-pivaloylphenyl) carbonate, bis(2-cyanophenyl) carbonate, bis(4-cyanophenyl) carbonate, bis(2-chlorophenyl) carbonate, bis(4-chlorophenyl) carbonate, bis(2, 4-dichlorophenyl) carbonate, bis(2, 4, 6-trichlorophenyl) carbonate, bis(2-nitrophenyl) carbonate, bis(4-nitrophenyl) carbonate, bis(2-fluorophenyl) carbonate, bis(2, 4-difluorophenyl) carbonate, bis(2, 4, 6-trifluorophenyl) carbonate, bis(2-trifluoromethylphenyl) carbonate, bis(4-trifluoromethylphenyl) carbonate, bis(2-chloro-4-trifluoromethylphenyl) carbonate, and the like.

In one embodiment the activated diaryl carbonate used according to the method of the present invention has structure I

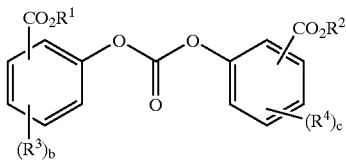

wherein $R^1$ and $R^2$ are independently $C_1$–$C_{20}$ alkyl radicals, $C_4$–$C_{20}$ cycloalkyl radicals or $C_4$–$C_{20}$ aromatic radicals, $R^3$ and $R^4$ are independently at each occurrence a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, and $C_1$–$C_{20}$ arylamino radical; and b and c are independently integers 0–4.

Examples of activated diaryl carbonates having structure I include bis(methyl salicyl) carbonate (BMSC), bis(ethyl salicyl) carbonate, bis(propyl salicyl) carbonate, bis(butyl salicyl) carbonate, bis(benzyl salicyl) carbonate, and bis(methyl 4-chlorosalicyl) carbonate. Typically BMSC is preferred.

The dihydroxy aromatic compound used according to the method of the present invention is typically selected from the group consisting of bisphenols having structure II,

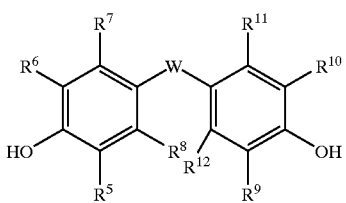

wherein $R^5$–$R^{12}$ are independently a hydrogen atom, halogen atom, nitro group, cyano group, $C_1$–$C_{20}$ alkyl radical $C_4$–$C_{20}$ cycloalkyl radical, or $C_6$–$C_{20}$ aryl radical; W is a bond, an oxygen atom, a sulfur atom, a $SO_2$ group, a $C_6$–$C_{20}$ aromatic radical, a $C_6$–$C_{20}$ cycloaliphatic radical or the group

wherein $R^{13}$ and $R^{14}$ are independently a hydrogen atom, $C_1$–$C_{20}$ alkyl radical, $C_4$–$C_{20}$ cycloalkyl radical, or $C_4$–$C_{20}$ aryl radical; or $R^{13}$ and $R^{14}$ together form a $C_4$–$C_{20}$ cycloaliphatic ring which is optionally substituted by one or more $C_1$–$C_{20}$ alkyl, $C_6$–$C_2$0 aryl, $C_5$–$C_2$, aralkyl, $C_5$–$C_{20}$ cycloalkyl groups or a combination thereof; dihydroxy benzenes having structure III

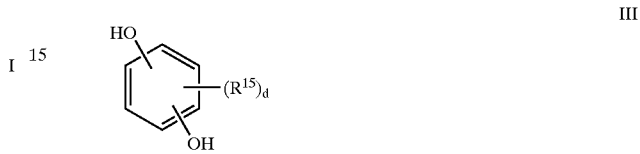

wherein $R_{15}$ is independently at each occurrence a halogen atom, nitro group, cyano group, $C_1$–$C_{20}$ alkyl radical, $C_4$–$C_{20}$ cycloalkyl radical $C_4$–$C_{20}$ aryl radical; and d is an integer from 0 to 4;

and dihydroxy naphthalenes having structures IV and V

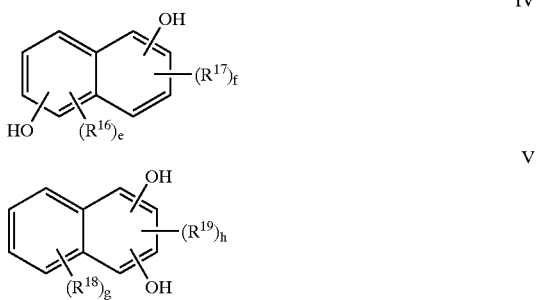

wherein $R^{16}$, $R^{17}$, $R^{18}$ and $R^{19}$ are independently at each occurrence a halogen atom, nitro group, cyano group, $C_1$–$C_{20}$ alkyl radical, $C_4$–$C_{20}$ cycloalkyl radical $C_4$–$C_{20}$ aryl radical; e and f are integers of from 0 to 3, g is an integer from 0 to 4, and h is an integer from 0 to 2.

Examples of bisphenols having structure II include 2,2-bis(4-hydroxyphenyl)propane (bisphenol A); 2,2-bis(3-methyl-4-hydroxyphenyl)propane; 1,1-bis(4-hydroxyphenyl)cyclohexane; 1,1-bis(4-hydroxyphenyl)-3,3, 5-trimethylcyclohexane; 1,3-bis(2-(4-hydroxyphenyl)-2-propyl)benzene; 1,4-bis(2-(4-hydroxyphenyl)-2-propyl) benzene; and 1,4-bis(2-(4-hydroxy-3-methylphenyl)-2-propyl)benzene.

Examples of dihydroxy benzenes having structure III include hydroquinone, resorcinol, methylhydroquinone, phenylhydroquinone, 4-phenylresorcinol; and 4-methylresorcinol.

Examples of dihydroxy naphthalenes having structure IV include 2,6-dihydroxy naphthalene; 2,6-dihydroxy-3-methyl naphthalene; 2,6-dihydroxy-3-phenyl naphthalene and of 2,8-dihydroxy naphthalene.

Examples of dihydroxy naphthalenes having structure V include 1,4-dihydroxy naphthalene; 1,4-dihydroxy-2-methyl naphthalene; 1,4-dihydroxy-2-phenyl naphthalene and 1,3-dihydroxy naphthalene.

The diacid may be an aromatic diacid such as 2,6-nathalene dicarboxylic acid, an aliphatic diacid such as succinic acid, or a cycloaliphatic di acid such as 1,7-cyclododecanedioic acid. Typically, the diacid employed is a diacid having structure VI

HO$_2$C—R$_{20}$—COOH　　　　　　　　　　　　VI wherein R$^{20}$ is a C$_4$–C$_{30}$ aromatic radical, a C$_1$–C$_{40}$ aliphatic radical, or a C$_5$–C$_{30}$ cycloaliphatic radical.

In addition to those diacids referenced above, diacids having structure VI include terephthalic acid; isophthalic acid; 1,4-cyclohexanediacrboxylic acid; hexanedioic acid; octanedioic acid; decanedioic acid; dodecanedioic acid; tetradecanedioic acid; hexadecanedioic acid; octadecanedioic acid; cis 9-octenedioic acid; alpha-nonyldecanedioic acid; alpha-octylundecanedioic acid; and hydrogenated dimer acid. Dodecanedioic acid is frequently preferred.

The melt polymerization catalyst used according to the method of the present invention may be any of a wide variety of transesterifcation catalysts capable of effecting reaction between the activated diaryl carbonate, the aromatic dihydroxy compound and the diacid present in the reaction mixture. The melt polymerization catalyst may be a single compound or a mixture of compounds and may be employed in combination with one or more co-catalysts such as quaternary ammonium salts or quaternary phosphonium salts.

From the standpoint of both cost and efficiency it has been found that metal hydroxides such as alkali metal hydroxides and alkaline earth metal hydroxides are well adapted to serve as melt polymerization catalysts, although a variety of other catalysts are well suited to this task.

Examples of alkaline earth metal hydroxides include lithium hydroxide, sodium hydroxide, potassium hydroxide, and mixtures thereof. Examples of alkaline earth metal hydroxides include calcium hydroxide, barium hydroxide, and mixtures thereof.

Other melt polymerization catalysts which may be used advantageously according to the method of the present invention include alkali metal salts of carboxylic acids, alkaline earth metal salts of a carboxylic acids, and mixtures thereof. Alkali metal salts of carboxylic acids include lithium acetate, sodium benzoate, and dipotassium dodecanedioate. Examples of alkaline earth metal salts of a carboxylic acids include calcium benzoate, calcium adipate, and barium acetate. The catalyst used according to the method of the present invention may the salt of a polycarboxyic acid such a tetrasodium ethylenediamine tetracarboxylate, or disodium magnesium ethylenediamine tetracarboxylate. Thus, salts of polycarboxylic acids comprising a variety of metal cations may be employed as the melt polymerization catalyst according to the method of the present invention, disodium magnesium ethylenediamine-tetracarboxylate serving as an example of a salt of a polycarboxylic acid comprising both alkali metal and alkaline earth metal cations.

In one embodiment of the present invention the melt polymerization catalyst comprises the salt of a non-volatile acid. By "non-volatile" it meant that the acid from which the catalyst is made has no appreciable vapor pressure under melt polymerization conditions. Examples of non-volatile acids include phosphorous acid, phosphoric acid, sulfuric acid, and metal "oxo acids" such as the oxo acids of germanium, antimony, niobium and the like. Salts of non-volatile acids useful as melt polymerization catalysts according to the method of the present invention include alkali metal salts of phosphites; alkaline earth metal salts of phosphites; alkali metal salts of phosphates; alkaline earth metal salts of phosphates, alkali metal salts of sulfates, alkaline earth metal salts of sulfates, alkali metal salts of metal oxo acids, and alkaline earth metal salts of metal oxo acids. Specific examples of salts of non-volatile acids include NaH$_2$PO$_3$, NaH$_2$PO$_4$, Na$_2$H$_2$PO$_3$, KH$_2$PO$_4$, CsH$_2$PO$_4$, CsH$_2$PO$_4$, Cs$_2$H$_2$PO$_4$, Na$_2$SO$_4$, NaHSO$_4$, NaSbO$_3$, LiSbO$_3$, KSbO$_3$, Mg(SbO$_3$)$_2$, Na$_2$GeO$_3$, K$_2$GeO$_3$, Li$_2$GeO$_3$, Mg GeO$_3$, Mg$_2$GeO$_4$, and mixtures thereof.

Typically the melt polymerization catalyst is employed in an amount equivalent to between about $1.0 \times 10^{-8}$ and about $1 \times 10^{-3}$, preferably between about $1.0 \times 10^{-8}$ and about $1 \times 10^{-5}$ moles of melt polymerization catalyst per mole of dihydroxy aromatic compound.

As mentioned, the method of the present invention may be practiced using a co-catalyst. Typically, the co-catalyst is a quaternary ammonium salt or quaternary phosphonium salt and is used in an amount corresponding to about 10 to about 250 times the molar amount of melt polymerization catalyst used. The catalyst and co-catalyst, may be added to the reaction mixture either simultaneously, or the catalyst and co-catalyst may be added separately at different stages of the polymerization reaction.

In one embodiment the co-catalyst comprises at least one quaternary ammonium salt having structure VII

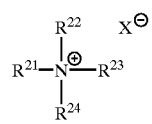

VII wherein R$^{21}$–R$^{24}$ are independently a C$_1$–C$_{20}$ alkyl radical, C$_4$–C$_{20}$cycloalkyl radical or a C$_4$–C$_{20}$ aryl radical and X$^-$ is an organic or inorganic anion.

In structure VII, the anion X$^-$ is typically an anion selected from the group consisting of hydroxide, halide, carboxylate, phenoxide, sulfonate, sulfate, carbonate, and bicarbonate. Examples of quaternary ammonium salts having structure VII include tetramethylammonium hydroxide, tetrabutylammonium acetate and the like.

In an alternate embodiment of the present invention, a quaternary phosphonium co-catlayst is employed, said co-catalyst having structure VII

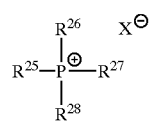

VIII wherein R$^{25}$–R$^{28}$ are independently a C$_1$–C$_{20}$ alkyl radical, C$_4$–C$_{20}$cycloalkyl radical or a C$_4$–C$_{20}$ aryl radical and X$^-$ is an organic or inorganic anion.

In structure VIII, the anion X$^-$ is typically an anion selected from the group consisting of hydroxide, halide, carboxylate, phenoxide, sulfonate, sulfate, carbonate, and bicarbonate. Examples of quaternary phosphonium salts having structure VIII include tetramethylphsophonium hydroxide, tetrabutylphosphonium acetate, tetrabutylphosphonium hydrogen carbonate, and the like.

With respect to co-catalysts having structures VII and VII, where X$^-$ is a polyvalent anion such as carbonate or sulfate it is understood that the positive and negative charges in structures VII and VII are properly balanced. For example, where R$^{25}$–R$^{28}$ in structure VIII are each butyl groups and X$^-$ represents a carbonate anion, it is understood that X$^-$ represents ½(CO$_3^{-2}$).

Typically, the reactants are employed according to the method of the present invention such that the molar ratio of activated diaryl carbonate to the total moles of aromatic dihydroxy compound and diacid is in a range between about 1.01 and about 2, preferably between about 1.01 and about 1.5, and still more preferably between about 1.01 and about 1.2. For example, in an embodiment wherein 2 moles of bis(methyl salicyl) carbonate is polymerized reacted with 0.95 moles of bisphenol A and 0.05 moles of adipic acid, the molar ratio of activated diaryl carbonate to aromatic dihydroxy compound and diacid is 2 to 1. Typically, the amount of dicarboxylic acid employed is a range between about 0.01 about 0.10 moles of dicarboxylic acid per mole of aromatic dihydroxy compound employed.

The reaction conditions of the melt polymerization are not particularly limited and may be conducted under a wide range of operating conditions. Hence, the term "melt polymerization conditions" will be understood to mean those conditions necessary to effect reaction between the activated diaryl carbonate, the dihydroxy aromatic compound, and the diacid of the present invention to afford a polyestercarbonate having sufficiently high molecular weight to possess useful polymer properties. Typically, the product polyestercarbonate has useful polymer properties when it possesses a weight average molecular weight of about 18,000 daltons or greater. The reaction temperature is typically in the range from about 150° C. to about 330° C. and preferably from about 170° C. to about 280° C. The pressure may be at atmospheric pressure, supraatmospheric pressure, or a range of pressures from atmospheric pressure to about 15 torr in the initial stages of the reaction, and at a reduced pressure at later stages, for example in the range of about 0.01 to about 15 torr. The reaction time is generally about 0.1 hours to about 10 hours.

In one embodiment of the present invention, reactants bis(methyl salicyl) carbonate, bisphenol A and dicarboxylic acid having structure VI are heated under melt polymerization conditions for a period of between about 0.1 and about 10 hours to a temperature in a range between about 150° C. and about 310° C. at a pressure in a range between about atmospheric pressure and about 0.01 torr, in the presence of a melt polymerization catalyst, said melt polymerization catalyst being present in an amount corresponding to between about $1.0 \times 10^{-8}$ and about $1 \times 10^{-3}$ moles per mole of bisphenol A, and a co-catalyst, said co-catalyst being present in an amount corresponding to between about 10 times and about 250 times the number of moles of melt polymerization catalyst.

The method of the present invention may be practiced in either a continuous or batch mode and may be conducted in stages, for example an initial oligomerization stage followed by a separate stage in which the initially formed oligomers are converted to higher molecular weight product. The method of the present invention is not particularly limited with respect to the reaction equipment employed. Any reactor, batch or continuous, capable of melt mixing the polymerization mixture and removing volatile side products may be used. Because of their high efficiency continuous reactors are preferred.

EXAMPLES

The following examples are set forth to provide those of ordinary skill in the art with a detailed description of how the methods claimed herein are evaluated, and are not intended to limit the scope of what the inventors regard as their invention. Unless indicated otherwise, parts are by weight, temperature is in ° C.

Molecular weights are reported as number average ($M_n$) or weight average ($M_w$) molecular weight and were determined by gel permeation chromatography (GPC) analysis, using a series of polystyrene molecular weight standards to construct a broad standard calibration curve against which polymer molecular weights were determined. The temperature of the gel permeation columns was about 25° C. and the mobile phase was chloroform.

Internal ester-carbonate and terminal hydroxy-ester groups were measured by $^{13}C$- and $^{31}P$-NMR respectively. Terminal hydroxy groups first derivatized with dioxaphospholanyl chloride and then measured by $^{31}P$-NMR. Incorporation of the diacid was measured by $^1H$-NMR.

Melt polymerization reactions were run in a 1.0 L glass reactor adapted for distillation under vacuum equipped with a solid nickel helical agitator. The reactor was configured such that by-product phenol or methyl salicylate could be distilled out of the reaction vessel and condensed in a chilled receiving vessel. Prior to its use, the reactor was soaked in 3N HCl for a period of 12 hours and was then soaked for an additional 12 hours in deionized water (18-Mohm) and placed in a drying oven overnight. Reaction temperature was controlled by immersion of the reactor into a fluidized sand bath equipped with a PID temperature controller. The temperature of the sand bath was monitored at the reactor sand bath interface. The pressure of the reaction vessel was controlled by means of a vacuum pump coupled to a nitrogen bleed. The pressure within the reactor was measured with an MKS pirani gauge. Ethylene diamine tetraaceticacid magnesium disodium salt (Alfa-Aesar, $1 \times 10^{-6}$ mole per mole bisphenol A) and tetrabutyl phosphonium acetate (Sachem, $2.5 \times 10^{-4}$ mole per mole bisphenol A) were added as solutions in deionized (18 M Ohm) water. Where the catalyst level was varied, the concentration of the catalyst solution was adjusted such that the volume of water introduced in the catalyst introduction step was held constant.

Example 1

The reactor was charged at ambient temperature and pressure with solid bisphenol A (General Electric Plastics Japan Ltd., 0.0.6570 mol), solid bis(methyl salicyl) carbonate (0.7211 mol) and 12.11g of dodecanedioic acid (0.0526 mol). The catalyst was then injected into the bisphenol A layer and the reactor assembled. The reactor was then evacuated briefly and nitrogen was reintroduced. This step was repeated three times. The reactor was then lowered into the sand bath maintained at 170° C. After a five minute period stirring at 250 rpm was initiated. The pressure was lowered to 250 mmHg and the temperature was ramped to 240° C. over 25 minutes. After an additional 25 minutes the reaction mixture had reached sufficient viscosity that the stirring was reduced to 38 rpm and the temperature increased to 260° C. over a five-minute period and full vacuum was applied. The viscosity was sufficiently high that the temperature was raised to 280° C. and the polymer extruded from the reactor.

Example 2 was carried out as in Example 1. Comparative Examples 1 and 2 (CE-1 and CE-2) were carried out as described in Example 1 with the exception that diphenyl carbonate (DPC) was used as the carbonate source instead of bis(methyl salicyl) carbonate (BMSC). Data are gathered in Table 1 for polyestercarbonates prepared according to the method of the present invention (Examples 1 and 2) and for polyestercarbonates prepared using diphenyl carbonate (Comparative Examples 1 and 2). The column headings "Diacid" and "DAC" refer to the diacid comonomer and the diaryl carbonate used in the polymerization respectively. The column headings "% Incorporation", and "% Endcap" refer to percentage of the diacid actually incorporated into the polymer backbone during the polymerization and the percentage of chain terminal groups in the product polymer which were not hydroxy groups. Typically a polycarbonate prepared by a process comprising the melt reaction of a bisphenol with a diaryl carbonate will possess chain terminal groups which are hydroxy groups or which are aryloxy groups derived from the diaryl carbonate.

TABLE 1

PREPARATION OF POLYESTER CARBONATES

| Example | Diacid | DAC | $M_w{}^b$ | % Incorporation | % Endcap |
|---|---|---|---|---|---|
| CE-1 | DDDA$^a$ | DPC | 60,000 | 84 | 75 |
| 1 | DDDA | BMSC | 48,000 | 95 | 95 |
| CE-2 | Adipic | DPC | 24,000 | 84 | 27 |
| 2 | Adipic | BMSC | 75,000 | 100 | 79 |

$^a$dodecanedioic acid
$^b$weight average molecular weight in daltons

The data in TABLE 1 reveal higher levels of diacid incorporation in the product polyestercarbonate prepared according to the method of the present invention that are obtained using an alternate method relying on diphenyl carbonate. The data also reveal that the method of the present invention affords polyestercarbonates having a higher level of "endcapping" than is available using the alternate method employing diphenyl carbonate.

The invention has been described in detail with particular reference to preferred embodiments thereof, but it will be understood by those skilled in the art that variations and modifications can be effected within the spirit and scope of the invention.

What is claimed is:

1. A method of preparing polyestercarbonates, said method comprising preparing a mixture comprising at least one activated diaryl carbonate, at least one dihydroxy aromatic compound, at least one dicarboxylic acid, at least one melt polymerization catalyst and optionally one or more co-catalysts, and heating under melt polymerization conditions to afford a product polyestercarbonate, said product polyestercarbonate having a percent endcap of more than 75 percent, said product polyestercarbonate incorporating at least 90 percent of the dicarboxylic acid starting material.

2. A method according to claim 1 wherein said activated diaryl carbonate is selected from the group consisting of bis(2-acetylphenyl) carbonate, bis(4-acetylphenyl) carbonate, bis(2-pivaloylphenyl) carbonate, bis(4-pivaloylphenyl) carbonate, bis(2-cyanophenyl) carbonate, bis(4-cyanophenyl) carbonate, bis(2-chlorophenyl) carbonate, bis(4-chlorophenyl) carbonate, bis(2,4-dichlorophenyl) carbonate, bis(2,4,6-trichlorophenyl) carbonate, bis(2-nitrophenyl) carbonate, bis(4-nitrophenyl) carbonate, bis(2-fluorophenyl) carbonate, bis(2,4-difluorophenyl) carbonate, bis(2,4,6-trifluorophenyl) carbonate, bis(2-trifluoromethylphenyl) carbonate, bis(4-trifluoromethylphenyl) carbonate, bis(2-chloro-4-trifluoromethylphenyl) carbonate, and mixture thereof.

3. A method according to claim 1 wherein said activated diaryl carbonate has structure I

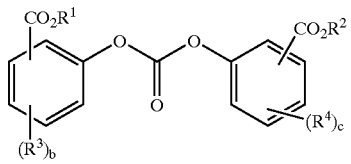

wherein $R^1$ and $R^2$ are independently $C_1$–$C_{20}$ alkyl radicals, $C_4$–$C_{20}$ cycloalkyl radicals or $C_4$–$C_{20}$ aromatic radicals, $R^3$ and $R^4$ are independently at each occurrence a halogen atom, cyano group, nitro group, $C_1$–$C_{20}$ alkyl radical, $C_4$–$C_{20}$ cycloalkyl radical, $C_4$–$C_{20}$ aromatic radical, $C_1$–$C_{20}$ alkoxy radical, $C_4$–$C_{20}$ cycloalkoxy radical, $C_4$–$C_{20}$ aryloxy radical, $C_1$–$C_{20}$ alkylthio radical, $C_4$–$C_{20}$ cycloalkylthio radical, $C_4$–$C_{20}$ arylthio radical, $C_1$–$C_{20}$ alkylsulfinyl radical, $C_4$–$C_{20}$ cycloalkylsulfinyl radical, $C_4$–$C_{20}$ arylsulfinyl radical, $C_1$–$C_{20}$ alkylsulfonyl radical, $C_4$–$C_{20}$ cycloalkylsulfonyl radical, $C_4$–$C_{20}$ arylsulfonyl radical, $C_1$–$C_{20}$ alkoxycarbonyl radical, $C_4$–$C_{20}$ cycloalkoxycarbonyl radical, $C_4$–$C_{20}$ aryloxycarbonyl radical, $C_2$–$C_{60}$ alkylamino radical, $C_6$–$C_{60}$ cycloalkylamino radical, $C_5$–$C_{60}$ arylamino radical, $C_1$–$C_{40}$ alkylaminocarbonyl radical, $C_4$–$C_{40}$ cycloalkylaminocarbonyl radical, $C_4$–$C_{40}$ arylaminocarbonyl radical, and $C_1$–$C_{20}$ acylamino radical; and b and c are independently integers 0–4.

4. A method according to claim 3 wherein said activated diaryl carbonate is selected from the group consisting of bis(methyl salicyl) carbonate, bis(ethyl salicyl) carbonate, bis(propyl salicyl) carbonate, bis(butyl salicyl) carbonate, bis(benzyl salicyl) carbonate, and bis(methyl 4-chlorosalicyl) carbonate.

5. A method according to claim 1 wherein said dihydroxy aromatic compound selected from the group consisting of bisphenols having structure II,

II wherein $R^5$–$R^{12}$ are independently a hydrogen atom, halogen atom, nitro group, cyano group, $C_1$–$C_{20}$ alkyl radical $C_4$–$C_{20}$ cycloalkyl radical, or $C_6$–$C_{20}$ aryl radical; W is a bond, an oxygen atom, a sulfur atom, a $SO_2$ group, a $C_6$–$C_{20}$ aromatic radical, a $C_6$–$C_{20}$ cycloaliphatic radical or the group wherein $R^{13}$ and $R^{14}$ are independently a hydrogen atom, $C_1$–$C_{20}$ alkyl radical, $C_4$–$C_{20}$ cycloalkyl radical, or $C_4$–$C_{20}$ aryl radical; or $R^{13}$ and $R^{14}$ together form a $C_4$–$C_{20}$ cycloaliphatic ring which is optionally substituted by one or more $C_1$–$C_{20}$ alkyl, $C_6$–$C_{20}$ aryl, $C_5$–$C_{21}$, aralkyl, $C_5$–$C_{20}$ cycloalkyl groups or a combination thereof; dihydroxy benzenes having structure III

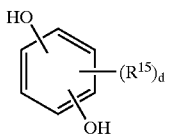

wherein R$^{15}$ is independently at each occurrence a halogen atom, nitro group, cyano group, C$_1$–C$_{20}$ alkyl radical, C$_4$–C$_{20}$ cycloalkyl radical C$_4$–C$_{20}$ aryl radical; and d is an integer from 0 to 4; and dihydroxy naphthalenes having structures IV and V

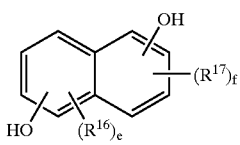

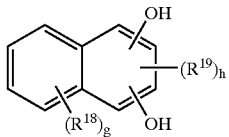

wherein R$^{16}$, R$^{17}$, R$^{18}$ and R$^{19}$ are independently at each occurrence a halogen atom, nitro group, cyano group, C$_1$–C$_{20}$ alkyl radical, C$_4$–C$_{20}$ cycloalkyl radical C$_4$–C$_{20}$ aryl radical; e and f are integers of from 0 to 3, g is an integer from 0 to 4, and h is an integer from 0 to 2.

6. A method according to claim 5 wherein said bisphenol having structure II is selected from the group consisting of 2,2-bis(4-hydroxyphenyl)propane (bisphenol A); 2,2-bis(3-methyl-4-hydroxyphenyl)propane; 1,1-bis(4-hydroxyphenyl)cyclohexane; 1,1-bis(4-hydroxyphenyl)-3,3,5-trimethylcyclohexane; 1,3-bis(2-(4-hydroxyphenyl)-2-propyl)benzene; 1,4-bis(2-(4-hydroxyphenyl)-2-propyl)benzene; and 1,4-bis(2-(4-hydroxy-3-methylphenyl)-2-propyl)benzene.

7. A method according to claim 5 wherein said dihydroxy benzene having structure III is selected from the group consisting of hydroquinone, resorcinol, methylhydroquinone, phenylhydroquinone, 4-phenylresorcinol, and 4-methylresorcinol.

8. A method according to claim 5 wherein said dihydroxy naphthalene having structure IV is selected form the group consisting of 2,6-dihydroxy naphthalene; 2,6-dihydroxy-3-methyl naphthalene; 2,6-dihydroxy-3-phenyl naphthalene and of 2,8-dihydroxy naphthalene.

9. A method according to claim 5 wherein said dihydroxy naphthalene having structure V is selected from the group consisting of 1,4-dihydroxy naphthalene; 1,4-dihydroxy-2-methyl naphthalene; 1,4-dihydroxy-2-phenyl naphthalene and 1,3-dihydroxy naphthalene.

10. A method according to claim 1 wherein said dicarboxylic acid has structure VI

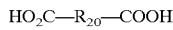

wherein R$^{20}$ is a C$_4$–C$_{30}$ aromatic radical, a C$_1$–C$_{40}$ aliphatic radical, or a C$_5$–C$_{30}$ cycloaliphatic radical.

11. A method according to claim 10 wherein said dicarboxylic acid having structure VI is selected from the group consisting of terephthalic acid; isophthalic acid; 1,4-cyclohexanediacrboxylic acid; hexanedioic acid; octanedioic acid; decanedioic acid; dodecanedioic acid; tetradecanedioic acid; hexadecanedioic acid; octadecanedioic acid; cis 9-octenedioic acid; alpha-nonyldecanedioic acid; alpha-octylundecanedioic acid; and hydrogenated dimer acid.

12. A method according to claim 1 wherein said melt polymerization catalyst is at least one metal hydroxide selected from the group consisting of alkali metal hydroxides, alkaline earth metal hydroxides, and mixtures thereof.

13. A method according to claim 12 wherein said melt polymerization catalyst is selected from the group consisting of sodium hydroxide, potassium hydroxide, and mixtures thereof.

14. A method according to claim 1 wherein said melt polymerization catalyst is selected from group consisting of alkali metal salts of carboxylic acids, alkaline earth metal salts of a carboxylic acids, and mixtures thereof.

15. A method according to claim 14 wherein said melt polymerization catalyst is disodium magnesium ethylenediamine tetracarboxylate.

16. A method according to claim 1 wherein said melt polymerization catalyst is at least one salt of a non-volatile acid selected from the group consisting of alkali metal salts of phosphites; alkaline earth metal salts of phosphites; alkali metal salts of phosphates; alkaline earth metal salts of phosphates, alkali metal salts of sulfates, alkaline earth metal salts of sulfates, alkali metal salts of metal oxo acids, alkaline earth metal salts of metal oxo acids, and mixture thereof.

17. A method according to claim 16 wherein said salt of a non-volatile acid melt polymerization catalyst is selected from the group consisting of NaH$_2$PO$_3$, NaH$_2$PO$_4$, Na$_2$H$_2$PO$_3$, KH$_2$PO$_4$, CsH$_2$PO$_4$, Cs$_2$H$_2$PO$_4$, Na$_2$SO$_4$, NaHSO$_4$, Na SbO$_3$,Lisb)$_3$, KSbO$_3$, Mg(SbO$_3$)$_2$, Na$_2$GeO$_3$, K$_2$GeO$_3$, Li$_2$GeO$_3$, Mg GeO$_3$, Mg$_2$GeO$_4$, and mixtures thereof.

18. A method according to claim 1 wherein the melt polymerization catalyst is present in an amount equivalent to between about $1.0 \times 10^{-8}$ and about $1 \times 10^{-3}$ moles of melt polymerization catalyst per mole of dihydroxy aromatic compound.

19. A method according to claim 1 wherein said co-catalyst is a quaternary ammonium salt having structure VII

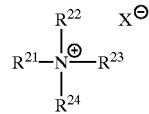

wherein R$^{21}$–R$^{24}$ are independently a C$_1$–C$_{20}$ alkyl radical, C$_4$–C$_{20}$cycloalkyl radical or a C$_4$–C$_{20}$ aryl radical and X$^-$ is an organic or inorganic anion.

20. A method according to claim 19 wherein said anion is selected from the group consisting of hydroxide, halide, carboxylate, phenoxide, sulfonate, sulfate, carbonate, and bicarbonate.

21. A method according to claim 20 wherein said quaternary ammonium salt co-catalyst is present in an amount such that the number of moles of co-catalyst employed corresponds to between about 10 and about 250 times the number of moles of melt polymerization catalyst present.

22. A method according to claim 1 wherein said co-catalyst is a quaternary phosphonium salt having structure VIII

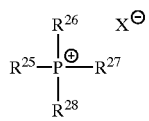

VIII wherein $R^{25}$–$R^{28}$ are independently a $C_1$–$C_{20}$ alkyl radical, $C_4$–$C_{20}$ cycloalkyl radical or a $C_4$–$C_{20}$ aryl radical and $X^-$ is an organic or inorganic anion.

23. A method according to claim 22 wherein said anion is selected from the group consisting of hydroxide, halide, carboxylate, phenoxide, sulfonate, sulfate, carbonate, and bicarbonate.

24. A method according to claim 23 wherein said quaternary phosphonium salt co-catalyst is present in an amount such that the number of moles of co-catalyst employed corresponds to between about 10 and about 250 times the number of moles of melt polymerization catalyst present.

25. A method of preparing polyestercarbonates, said method comprising heating to a temperature in a range between about 150° C. and about 250° C. at a pressure in a range between about atmospheric pressure and about 0.01 torr, a mixture comprising bis(methyl, salicyl) carbonate, bisphenol A, a melt polymerization catalyst present in an amountcorresponding to between about $1.0 \times 10^{-8}$ and about $1 \times 10^{-3}$ moles of melt polymerization catalyst per mole of bisphenol A, a co-catalyst present in an amount corresponding to between about 10 times and about 250 times the number of moles of melt polymerization catalyst, and a dicarboxylic acid having structure VI

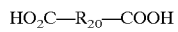

$HO_2C$—$R_{20}$—$COOH$    VI wherein $R^{20}$ is a $C_4$–$C_{30}$ aromatic radical, a $C_1$–$C_{40}$ aliphatic radical, or a $C_5$–$C_{30}$ cycloaliphatic radical, to afford a product polyestercarbonate, said product polyestercarbonate having a percent endcap of more than 75 percent, said product polyestercarbonate incorporating at least 90 percent of the dicarboxylic acid starting material.

26. A method according to claim 25 wherein the bis (methyl salicyl) carbonate is present in an amount corresponding to between about 1.01 and about 1.2 moles of bis(methyl salicyl) carbonate per mole of bisphenol A, and wherein said dicarboxylic acid VI is present in an amount corresponding to between about 0.01and about 0.10 moles of dicarboxylic acid per mole of bisphenol A.

27. A method according to claim 26 wherein said melt polymerization catalyst is disodium magnesium ethylenediamine tetracarboxylate, and said co-catalyst is tetrabutylphosphonium acetate.

28. A method of preparing polyestercarbonates, said method comprising heating to a temperature in a range between about 150° C. and about 250° C. at a pressure in a range between about atmospheric pressure and about 0.01 torr a mixture comprising bis(methyl salicyl) carbonate, bisphenol A, sodium hydroxide said sodium hydroxide being present in an amount corresponding to between about $1.0 \times 10^{-8}$ and about $1 \times 10^{-3}$ moles sodium hydroxide per mole of bisphenol A, tetrabutylphosphonium acetate co-catalyst said co-catalyst being present in an amount corresponding to between about 10 times and about 250 times the number of moles of sodium hydroxide, and dodecanedioic acid said dodecanedioic acid being present in an amount corresponding to between about 0.01 mole per mole of bisphenol A and about 0.1 mole per mole of bisphenol A to afford a product polyestercarbonate, said product polyestercarbonate having a percent endcap of more than 75 percent, said polyestercarbonate incorporating at least 90 percent of the dicarboxylic acid starting material.

* * * * *